(12) United States Patent
Saada et al.

(10) Patent No.: US 11,007,913 B2
(45) Date of Patent: May 18, 2021

(54) VEHICLE SEAT WITH TILTING BACKREST

(71) Applicant: EXPLISEAT, Paris (FR)

(72) Inventors: Benjamin Jacob Saada, Paris (FR); Nicolas Saillard, Gujan-Mestras (FR); Thibault Hermil, Paris (FR); Christophe Jacob, Saint Maurice (FR); Vincent Tejedor, Issy les Moulineaux (FR)

(73) Assignee: EXPLISEAT, Paris (FR)

( * ) Notice: Subject to any disclaimer, the term of this patent is extended or adjusted under 35 U.S.C. 154(b) by 0 days.

(21) Appl. No.: 16/483,594

(22) PCT Filed: Feb. 6, 2018

(86) PCT No.: PCT/FR2018/050288
§ 371 (c)(1),
(2) Date: Aug. 5, 2019

(87) PCT Pub. No.: WO2018/146412
PCT Pub. Date: Aug. 16, 2018

(65) Prior Publication Data
US 2020/0001753 A1    Jan. 2, 2020

(30) Foreign Application Priority Data
Feb. 8, 2017    (FR) ....................... 1751049

(51) Int. Cl.
*B60N 2/42*    (2006.01)
*B60N 2/427*    (2006.01)
(Continued)

(52) U.S. Cl.
CPC ..... *B60N 2/42745* (2013.01); *B60N 2/42709* (2013.01); *B60N 2/933* (2018.02);
(Continued)

(58) Field of Classification Search
CPC ....................... B60N 2/42709; B60N 2/42745; B60N 2/933
(Continued)

(56) References Cited

U.S. PATENT DOCUMENTS

| | | | | |
|---|---|---|---|---|
| 4,145,081 A | * | 3/1979 | Withers | ............... B60N 2/4221 |
| | | | | 297/216.14 |
| 4,938,527 A | * | 7/1990 | Schmale | ................ B60N 2/686 |
| | | | | 297/216.13 |

(Continued)

FOREIGN PATENT DOCUMENTS

| | | | | |
|---|---|---|---|---|
| DE | 10102109 A1 | * | 7/2002 | ........... B60N 2/4228 |
| EP | 2 955 055 A1 | | 12/2015 | |
| FR | 2 375 068 A1 | | 7/1978 | |

OTHER PUBLICATIONS

International Search Report for International Application No. PCT/FR2018/050288 dated May 14, 2018.
(Continued)

*Primary Examiner* — Rodney B White
(74) *Attorney, Agent, or Firm* — Pearne & Gordon LLP

(57) ABSTRACT

Vehicle seat fixed to the floor of a cabin of a vehicle and which is able to absorb the impact of a passenger seated behind. It comprises at least two uprights (20) per backrest, these being positioned substantially vertically and engaged via a lower end (30) in the fixed framework (32) of the seat in such a way as to be releasable through upward translational movement so that they can disengage upward under the effect of an impact on a rear face, and are mounted with the ability to rotate about at least one fixed axis of the fixed framework (32) so as to be able to pivot forwards after becoming disengaged. At least one deliberate mechanical weak link positioned between each upright (20) and the framework (32) blocks the translational movement of the
(Continued)

Figure 1A:
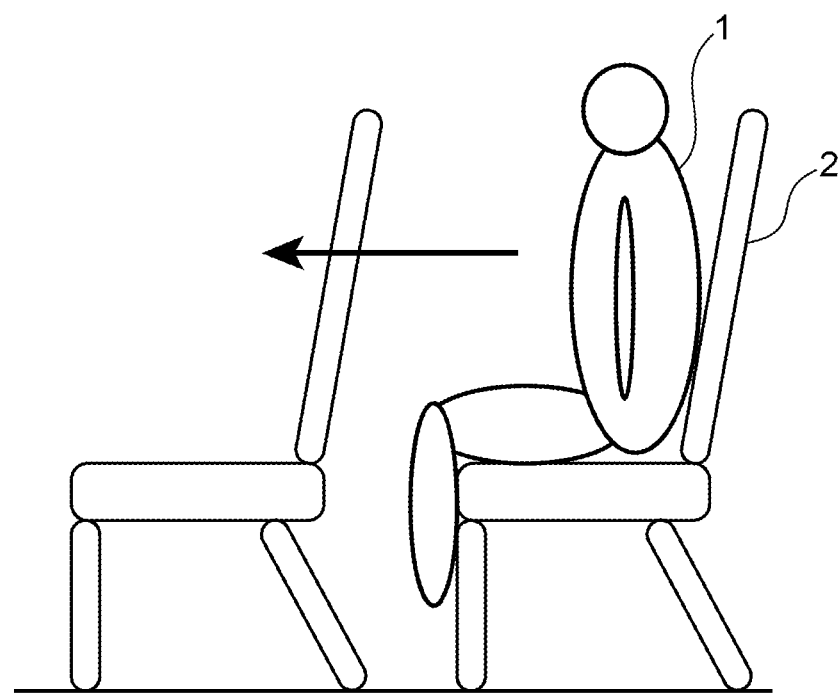

upright below a determined force corresponding to the impact. Application to aircraft seats.

10 Claims, 8 Drawing Sheets

(51) Int. Cl.
  *B60N 2/90* (2018.01)
  *F16F 1/14* (2006.01)
  *F16F 7/12* (2006.01)
(52) U.S. Cl.
  CPC .................. *F16F 1/14* (2013.01); *F16F 7/12* (2013.01); *F16F 2232/06* (2013.01)
(58) Field of Classification Search
  USPC ........................................ 297/216.13, 216.14
  See application file for complete search history.

(56) References Cited

U.S. PATENT DOCUMENTS

| | | | | |
|---|---|---|---|---|
| 5,219,202 A | * | 6/1993 | Rink | B60N 2/42709 |
| | | | | 297/216.13 |
| 5,507,555 A | * | 4/1996 | Kiguchi | B60N 2/10 |
| | | | | 297/216.13 X |
| 5,722,722 A | * | 3/1998 | Massara | B60N 2/4228 |
| | | | | 297/216.13 |
| 6,022,074 A | * | 2/2000 | Swedenklef | B60N 2/2222 |
| | | | | 297/216.14 |
| 6,024,406 A | * | 2/2000 | Charras | B60N 2/2222 |
| | | | | 297/216.14 |
| 6,074,004 A | * | 6/2000 | Carmichael | B60N 2/4221 |
| | | | | 297/216.13 |
| 6,123,388 A | * | 9/2000 | Vits | B60N 2/688 |
| | | | | 297/216.13 |
| 6,485,098 B1 | * | 11/2002 | Vits | B60N 2/242 |
| | | | | 297/216.13 |
| 6,604,787 B1 | * | 8/2003 | Brockman | B60N 2/68 |
| | | | | 297/216.13 |
| 7,055,901 B2 | * | 6/2006 | Graham | B60N 2/242 |
| | | | | 297/216.13 X |
| 7,059,675 B2 | * | 6/2006 | Nelson | B60N 2/42709 |
| | | | | 297/216.13 X |
| 7,354,105 B2 | * | 4/2008 | Nelson | B60N 2/4221 |
| | | | | 297/216.13 X |
| 7,377,590 B2 | * | 5/2008 | Mattes | B60N 2/688 |
| | | | | 280/806 |
| 7,611,197 B2 | * | 11/2009 | Mattes | B60N 2/42736 |
| | | | | 297/216.14 |
| 7,789,460 B2 | * | 9/2010 | Lamparter | B60R 22/023 |
| | | | | 297/216.13 |
| 10,696,195 B2 | * | 6/2020 | Young | B60N 2/4221 |
| 2006/0028038 A1 | * | 2/2006 | Glasgow | F16F 7/125 |
| | | | | 293/132 |
| 2017/0136929 A1 | | 5/2017 | Tejedor et al. | |
| 2018/0229846 A1 | | 8/2018 | Saada et al. | |

OTHER PUBLICATIONS

Written Opinion for International Application No. PCT/FR2018/050288 dated May 14, 2018.
Preliminary French Search Report for French Patent Application No. 1751049 dated Oct. 17, 2017.

* cited by examiner

VEHICLE SEAT WITH TILTING BACKREST

FIELD OF THE INVENTION

The invention relates to seats provided in vehicles, and in particular aircraft, with these seats often being multiple-seater and having to be able to ensure maximum safety for the passenger seated in the seat placed directly behind the seat considered, in case of an accident, crash or emergency landing, the head, the arms and the legs of said passenger able to be precipitated against the seat placed directly in front of the latter.

CONTEXT, PRIOR ART AND PROBLEM RAISED

Seats in means of transport, and in particular of aircraft, must pass drastic tests in order to guarantee the safety of the passengers transported. Tests must evaluate in particular the injury caused to a passenger during an emergency landing, supposing that the passenger of a given row can then be stopped by the row located immediately in front, in the direction of flight of the aircraft.

All of the other tests imposed on the structure, static and dynamic tests with a single row, require a seat that is relatively rigid, with the path of force that connects the passenger to the floor having to be intact at the end of the tests. In addition, active or passive processes that dampen energy must not be triggered. Only the so-called "two row" test, which evaluates the impacts caused to the passenger in the case of a crash, can allow for the activation of the energy damping process.

Figure 1B:
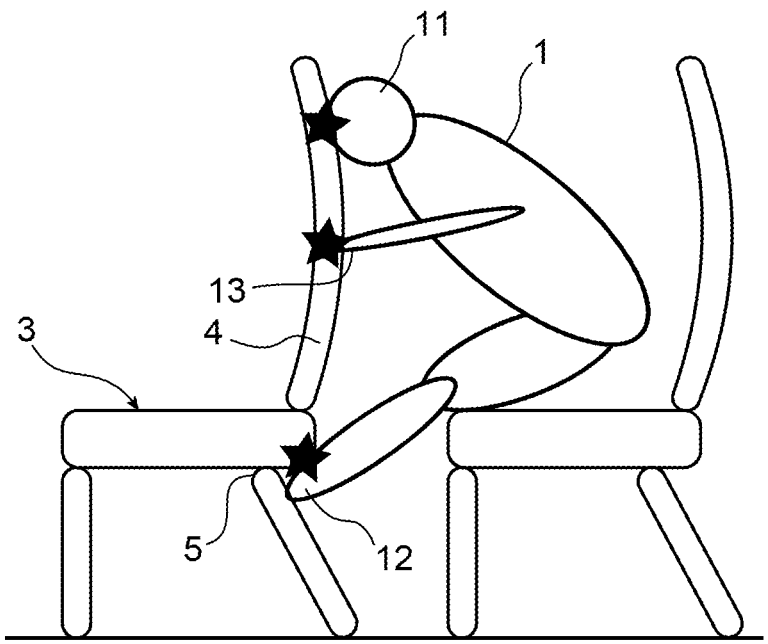

The principle of the test is shown in FIGS. 1A and 1B. A passenger 1 is seated on a seat 2 of the rear row, and a strong acceleration (16 g, i.e. 16 times greater than the gravitational attraction on the surface of the Earth) projects him forward, in order to simulate an emergency landing. This acceleration is symbolised by an arrow.

In the case of a very rigid seat structure, multiples impacts are anticipated in this type of situation, as shown in 1B.

The main impact is that that the head 11 of the passenger 1 is subjected to by striking the rear of the backrest of the seat 3 of the row in front. For this impact, the head injury criterion 11 (or HIC) makes it possible to quantify the severity of the injuries felt by the passenger 1. This criterion is defined with the following formula:

$$HIC = \max_{t_1, t_2} \left( (t_2 - t_1) \left( \frac{1}{t_2 - t_1} \int_{t_1}^{t_2} a(t) dt \right)^{5/2} \right)$$

In this formula, $t_1$ and $t_2$ are two temporal limits, with time being expressed in seconds, and $a(t)$ is the acceleration of the head 11 of the dully over time, expressed in g (g=9.81 m·s$^{-2}$). This criterion must be less than 1000 in order for the test to be considered as successful.

The secondary impact is linked to the impact of the tibias 12 against the low structure 5 of the seat 3, and a second criterion is defined with the compression measured on femurs of the dummies, which must not exceed a force of 10 kN.

Finally, the last impact is that of the hands 13 or of the wrists against the rear of the backrest 4: this impact is generally of low intensity, and can only be taken into consideration as a triggering element of certain active or passive safety components.

In order to minimise the injuries for the passenger 1, the seat 3 has to be as much as possible deformable, and of low rigidity. The deformability will make it possible to increase the contact surface between the head 11 and the seat 3, and to minimise the pressure felt by the head 11 during the impact, the low rigidity will limit the transmission of force at the contact surface fixed.

These constraints of deformability and of low rigidity are contradictory with the properties required to satisfy the requirements of static tests and of dynamic tests. The structure must on the contrary be able to be deformed the least possible during stresses, and as much as possible return to its initial position after the test.

Figure 2A:
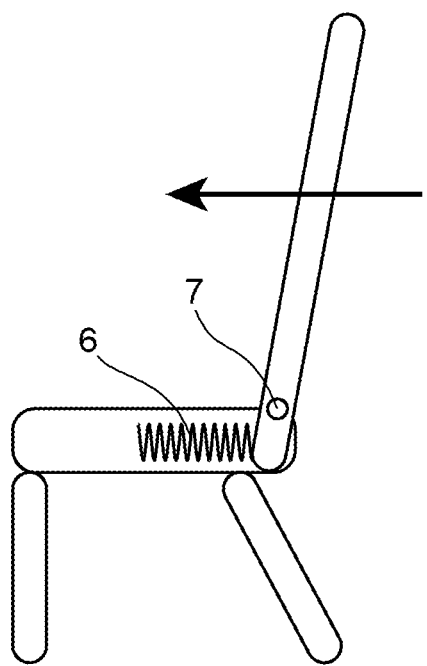
Figure 2B:
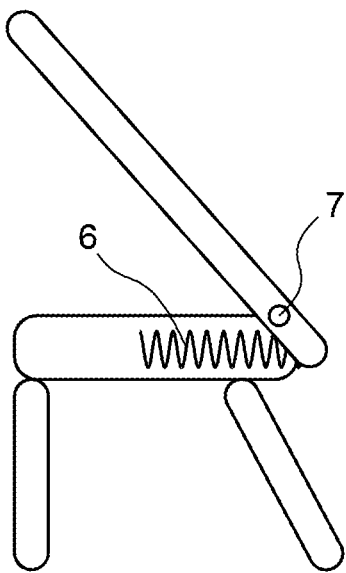

In reference to FIGS. 2A and 2B, a current solution consists in using passive safety components, mainly cylinders or springs 6, in the mechanism for reclining the seat backrests. A linear cylinder or a simple spring 6 is housed in the seat base of the seat and activated in the case of impact, and makes it possible to gently dampen the head of the rear passenger.

An important criterion in order for the passive component to be qualified is that the backrest 2 must be able to be put back into its initial position, after testing, with a low force. The solution with a cylinder or spring 6 and axis of rotation 7 easily makes it possible to achieve this objective. The rotation is blocked with a fusible element or which is triggered beyond a certain level of force (ratchet), the spring or the cylinder 6 makes it possible to dampen the forward movement of the backrest 2, and the axis of rotation guides 7 the backrest to its initial position after testing.

The system must thus be able to be activated only during an impact, dampen the head of the passenger, and allow the backrest 2 to be put back into position (reversibility) after the test.

This solution is simple to implement, but remains relatively complex in the case of non-reclining seats, because the axis of rotation 7 and the cylinder or spring 6 are then used only in the case of a crash, and not in common use in order to recline the backrest 2 of the seat towards the rear.

Figure 3A:
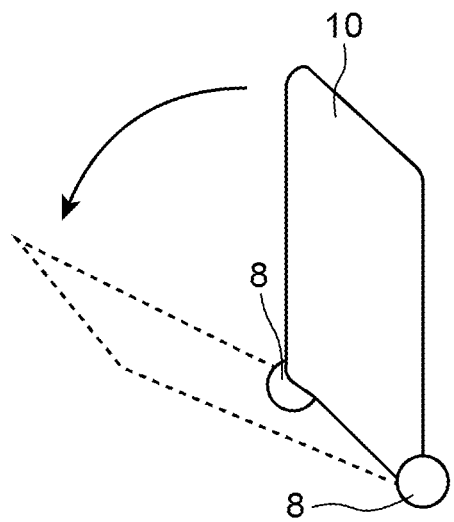
Figure 3B:
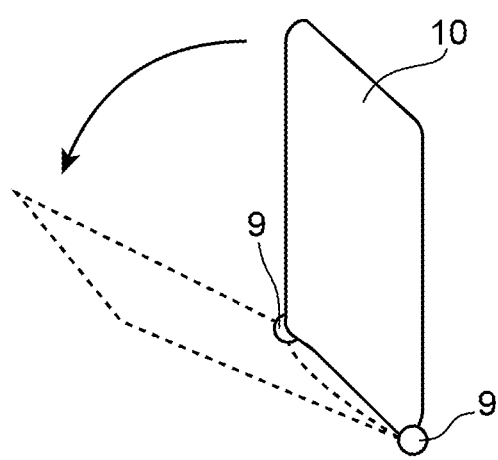

In reference to FIGS. 3A and 3B, in the case of a seat with a non-reclinable backrest 10, the problem of lightening the mass is concentrated in the minimisation of the rotation system of the backrest 10, a substantial axis 8 (FIG. 3A) being very robust, but forming a dead mass outside the case of a crash. The decrease in the diameter of the axis of rotation 9 (FIG. 3B) leads to a risk of plastic torsion in case of a crash. The two axes of rotation on either side of the backrest 10 are then no longer aligned and putting the backrest 10 back into place can require a substantial force, greater than that authorised by the standard.

In order to understand the interest of this device, recall that the backrest is normally stressed in all directions of space in the static tests: front/rear (axis x), left/right (axis y) and up/down (axis z).

A simple and robust axis of rotation (usual solution) weakens the backrest in the front/rear direction (rotation about the Y axis). The fusible element opposes a resistance in rotation and must be able to withstand the moments imposed in the static tests (90 kg at the top of the backrest, which is about 600 N·m on the axis of rotation), which leads to a highly constraining sizing.

A ball-joint connection, which would avoid any risk of misalignment of the axes on either side of the backrest, weakens the backrest in the front/read direction (rotation about the Y axis) and in the right/left direction (translation according to the Y axis). The fusible element should also be able to supporter nearly 600 N·m about the Y axis before activation.

A simple axis of rotation on either side of the backrest 10 is thus too fragile to satisfy all of the constraints bearing on the aircraft seat.

OBJECT OF THE INVENTION

In order to obtain a light system and which makes it possible to put the backrest back in place after the crash, the concept of this invention consists in combining a pivot and a slide, in order to adjust the moment when the rotation is solicited in order to reduce the forces exerted on the axis, and prevent the misaligning of the axes of rotation on either side of the backrest.

Consequently, the main object of the invention is a seat for a vehicle intended to be fixed to the floor of a cabin of a vehicle, comprising:
 a fixed frame itself comprising feet and at least one seat base, and
 the same number of backrest(s) as seat base(s) fixed to the fixed frame and comprising at least two uprights placed more vertically than horizontally along a determined direction (Y).

According to the invention, the uprights are embedded by a lower end in the frame in a releasable manner with respect to the fixed frame in translation upwards in such a way as to be able to be disembedded upwards under the effect of an impact on a rear face of the corresponding seatback and are rotatably mounted around at least one fixed axis of the fixed frame, in such a way as to be able to pivot forward after having been disembedded, this in case of impact of the head of a passenger placed on a seat fixed behind the seat considered, in case of a forced landing in the case of an aircraft.

Preferably, it comprises at least one mechanical fuse between each upright and the fixed frame in order to block in translation the upright below a determined force.

In a first embodiment of the invention, the pivoting of each upright is carried out with at least one flexible element fixed by a first end to the fixed frame, on the embedding, and, slidingly, by a second end to the upright, immediately above the lower end of the upright, making it possible to put back the upright embedded in the fixed frame after a pivoting in relation to the fixed frame.

The sliding is carried out with a slide-pinch fixed to the second end of said at least one element.

In a first embodiment of the fixed element, the latter is formed of a flexible strip.

In a second embodiment of this fixed element, the latter is formed of a spring blade.

In a third embodiment of this fixed element, the latter is formed from two flexible rods.

In a fourth embodiment of this fixed element, the latter is formed from a torsion spring formed of a rod surrounding the upright by an upper end and surrounding the embedding by a lower end.

In a second embodiment of the invention, the pivoting of each upright is carried out with at least one mechanical axis of rotation fixed to the fixed frame and a slot of the upright in a longitudinal direction of the upright and wherein the mechanical axis of rotation can slide.

Said at least one mechanical fuse can be carried out either with glue, or with at least one rivet, in particular made of plastic or metallic material.

LIST OF FIGURES

Figure 4A:
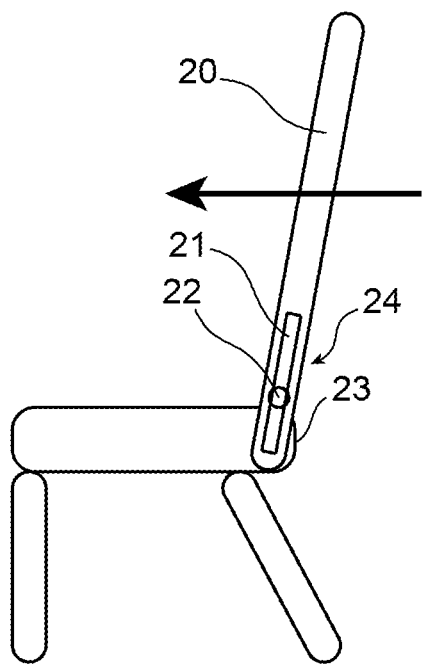
Figure 4B:
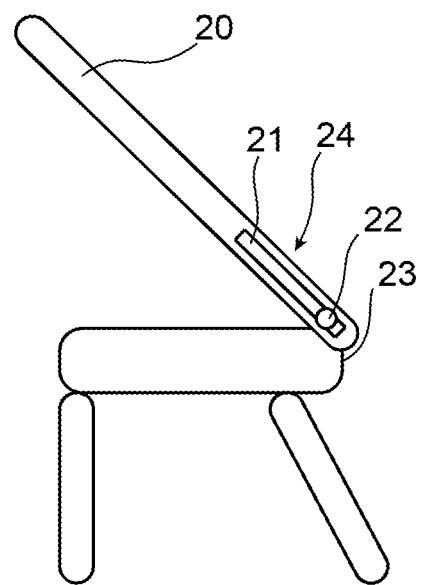
Figure 5A:
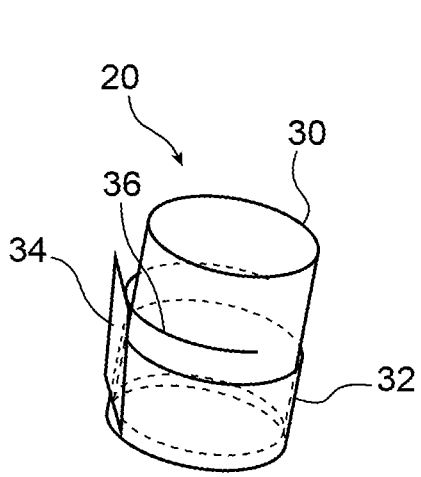
Figure 5B:
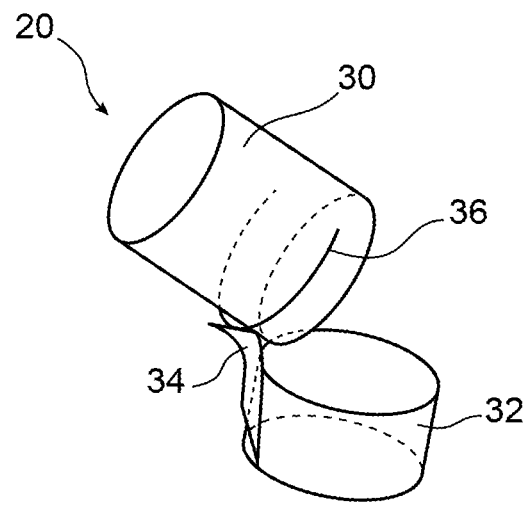
Figure 6:
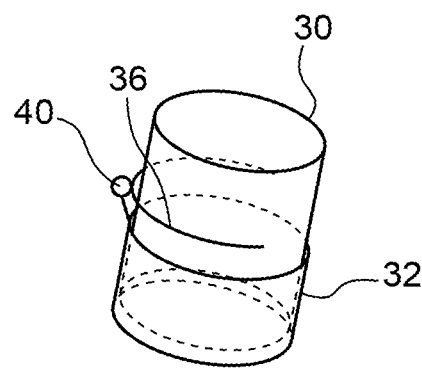
Figure 7:
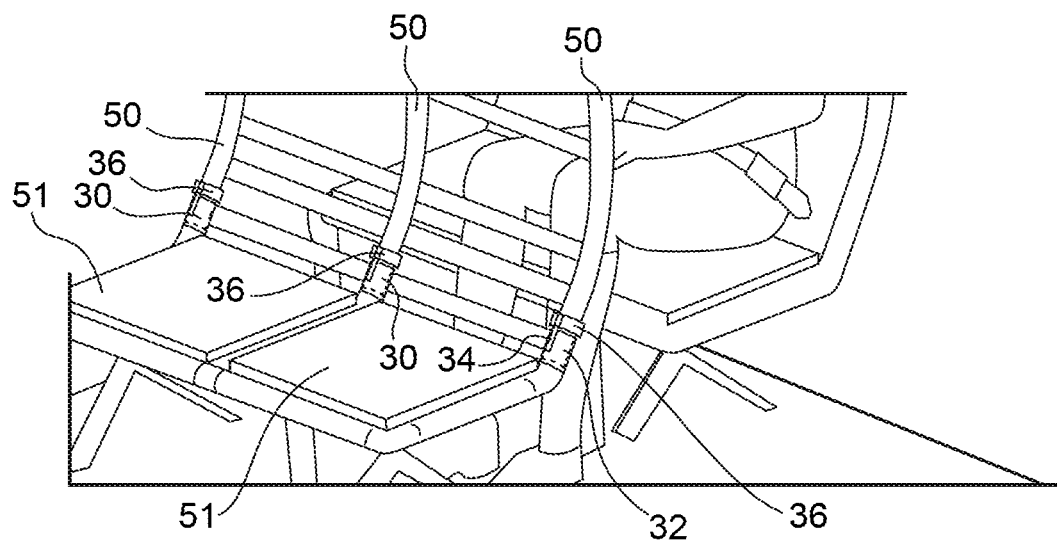
Figure 8A:
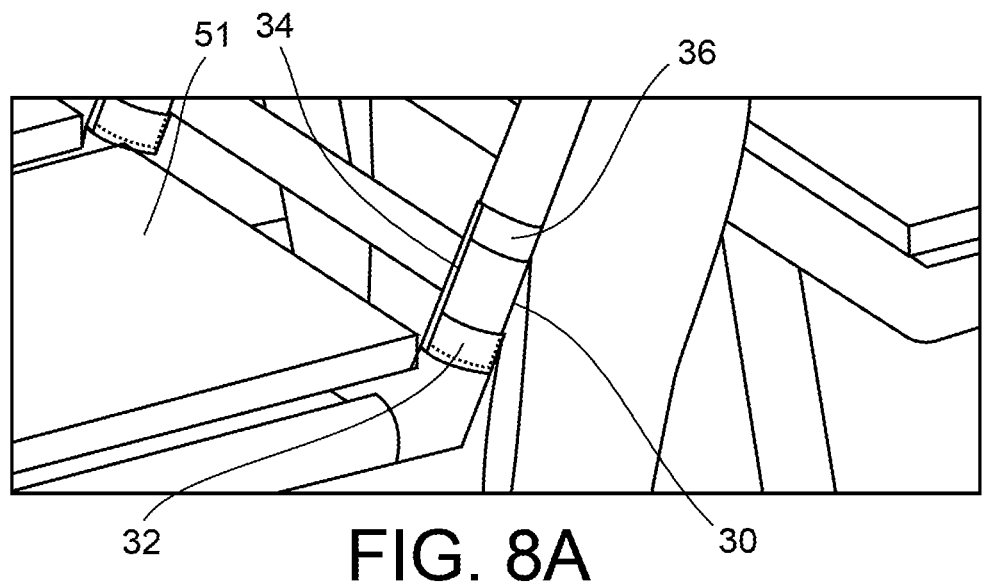
Figure 8B:
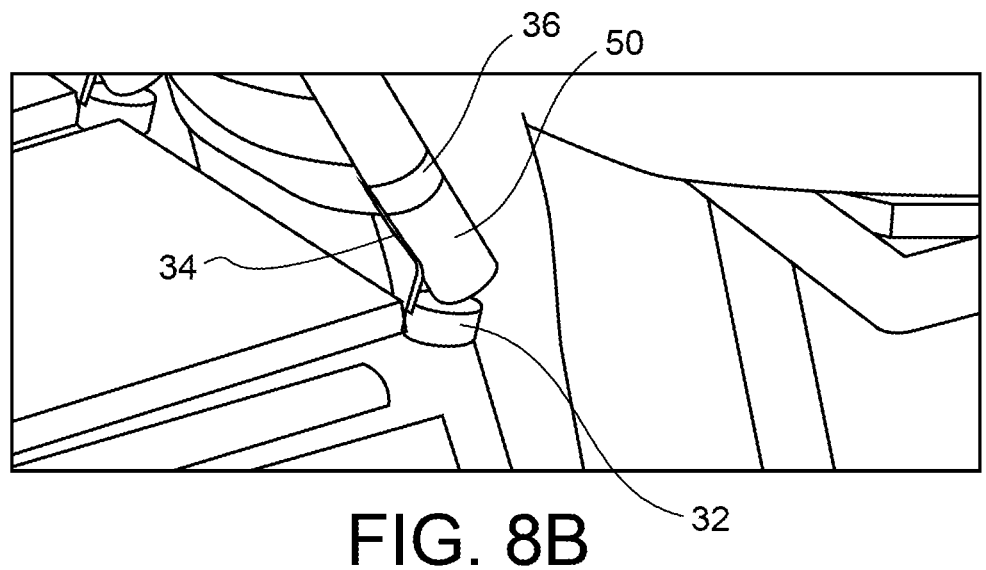
Figure 9A:
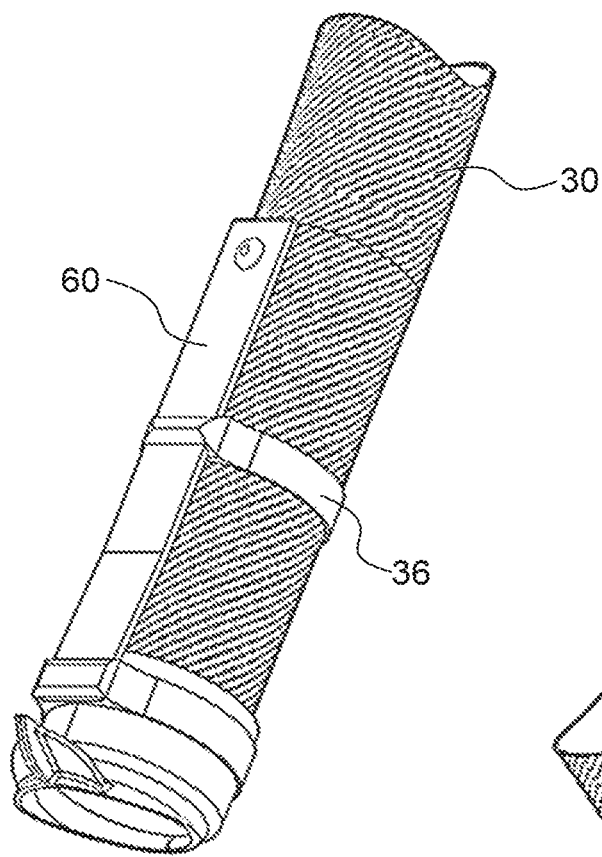
Figure 9B:
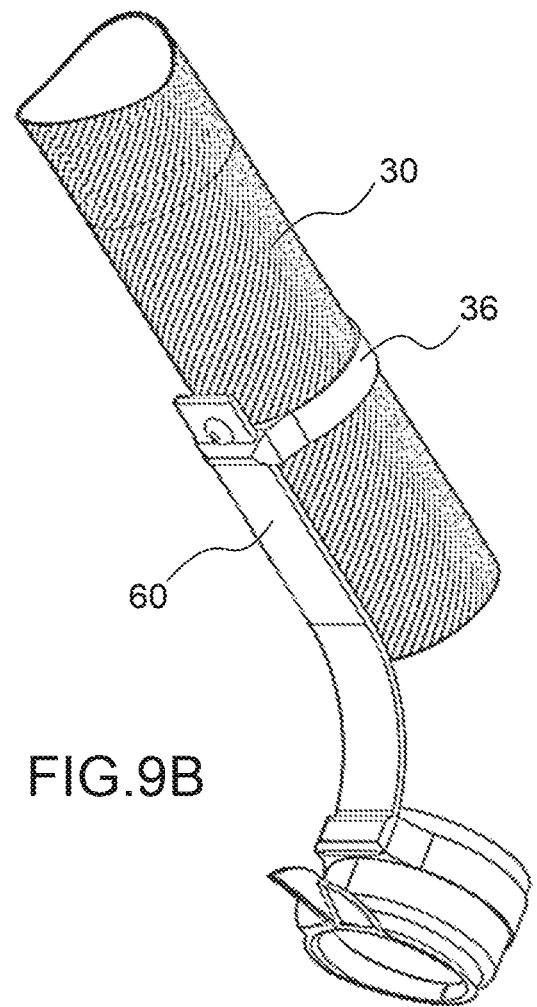
Figure 10:
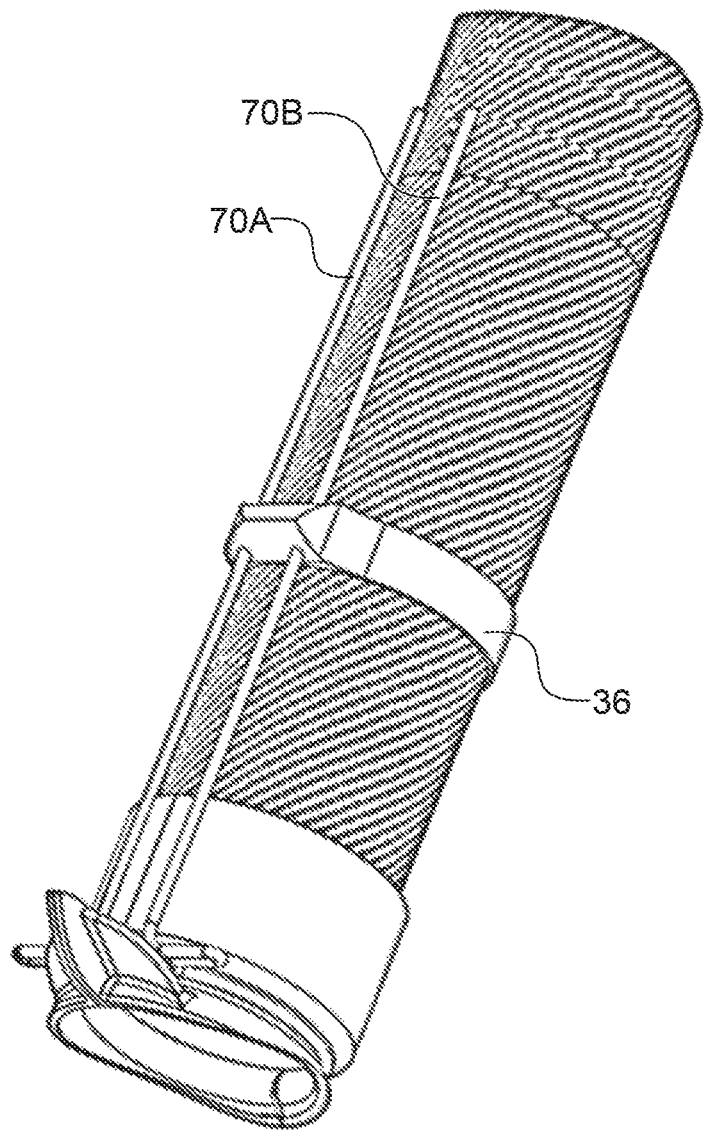
Figure 11A:
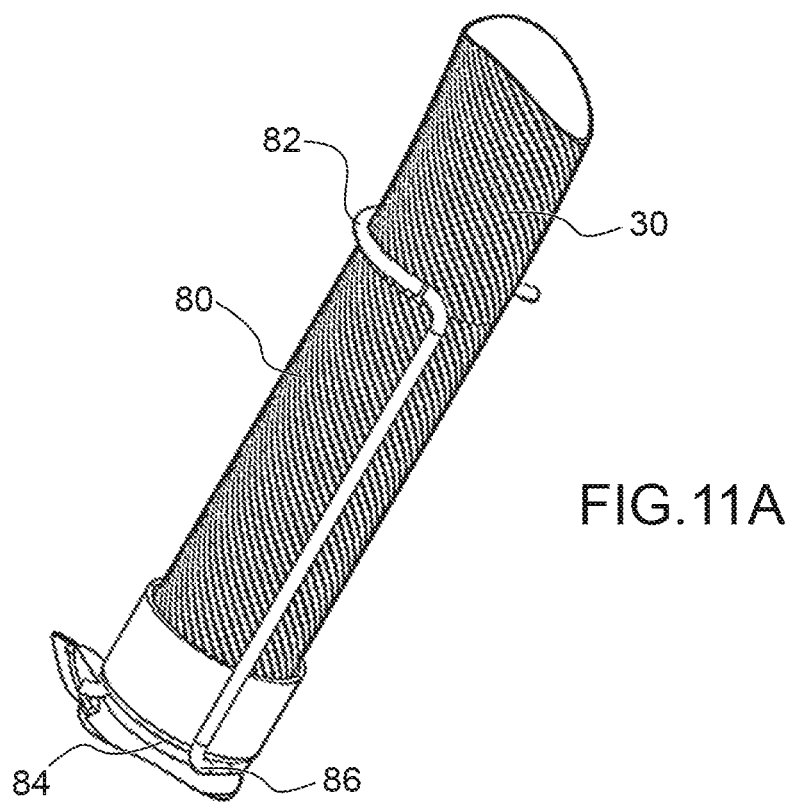
Figure 11B:
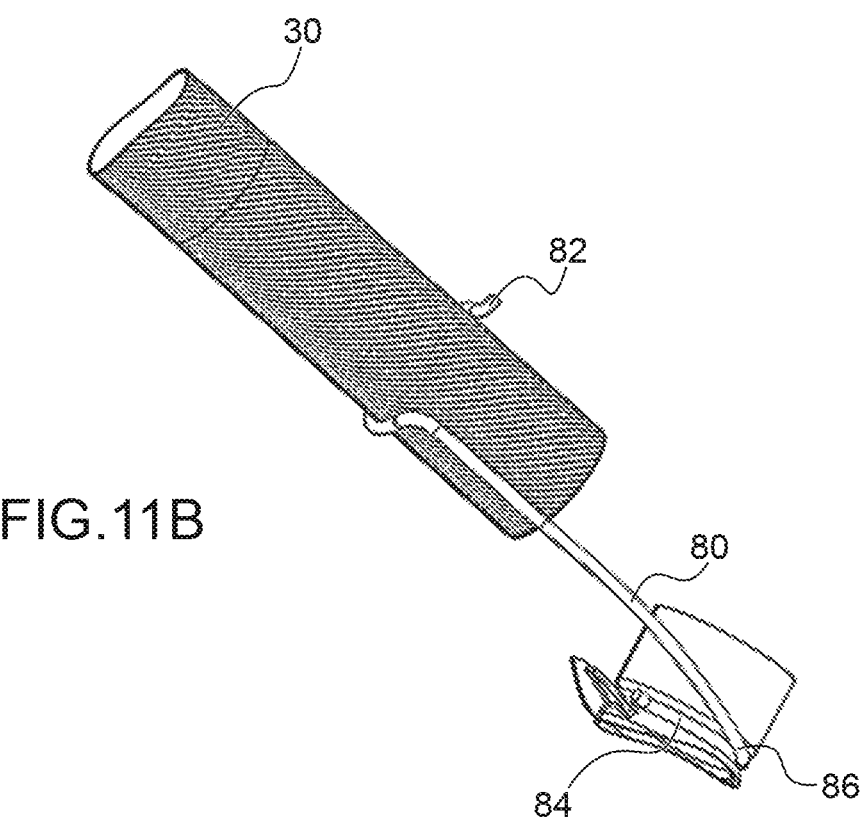

The invention and its various characteristics will be understood better when reading the following description of two embodiments of the invention. It is accompanied by different figures respectively showing:
 FIGS. 1A and 1B, a diagram that evokes a problem that the invention is intended to remedy;
 FIGS. 2A and 2B, two explanatory diagrams of a device according to prior art;
 FIGS. 3A and 3B, two other embodiments according to prior art;
 FIGS. 4A and 4B, explanatory diagrams of the concept according to the invention;
 FIGS. 5A and 5B, two theoretical diagrams of a first embodiment of the seat according to the invention;
 FIG. 6, a theoretical diagram of a second embodiment of the seat according to the invention;
 FIG. 7, the seat according to the invention with the location of the mechanism of the embodiment of FIGS. 5A and 5B;
 FIGS. 8A and 8B, two partial enlarged figures of the two positions of the seat according to the invention;
 FIGS. 9A, 9B a second implementation of the first embodiment;
 FIG. 10, a third implementation of the first embodiment; and
 FIGS. 11A and 11B, a fourth implementation of the first embodiment.

DETAILED DESCRIPTION OF TWO EMBODIMENTS OF THE INVENTION

In reference to FIGS. 4A and 4B, the principle of the seat uses, diagrammatically, a slide 24 placed longitudinally in the lower portion of the upright 20 of the backrest and in its globally vertical axis of direction, in the position of use. An axis of rotation 22, integral with the fixed frame 23 of the seat, and of a diameter slightly less than the width of the slot 21 passes in the latter. Theoretically, the upright 20 of the backrest can therefore slide in a globally vertical direction (axis Z) with respect to the fixed frame 23 of the seat. This is shown in FIG. 4A.

FIG. 4B shows the state of the seat according to the invention, theoretically, after the impact of the body of a passenger placed on a seat itself placed behind the seat shown in these FIGS. 4A and 4B. The upright 20 of the seatback has undergone a slight translation upwards, thanks to a sliding of the backrest with respect to the axis of rotation 22 which is fixed in relation to the fixed frame 23 of the seat. Then, after this slight translation upwards, the upright 20 of the backrest tilts forward, i.e. towards the left, in FIG. 4B.

The fixation of the upright 20 of the backrest with respect to the fixed structure 23 of the seat is done via releasable embedding, i.e. an embedding that does not have a tight fit. Indeed, a preferred embodiment of this type of seat consists in that the fixed structure of the seat is formed of tubular elements assembled by sleeves with a tight fit. In the case of the seat according to the invention, the fitting of the upright 20 of the seatback in the fixed frame 23 of the seat is not tight. Because of this, when an impact occurs on the rear surface of the upright 20 of the seatback, the latter causes, among other things, vibrations that cause the upright 20 of the backrest to exit from its non-tight embedding with respect to the fixed portion 23 of the seat, with the embedding not being carried out over a great length. Once released from this embedding, the seatback 20, under the effect of the force of the impact under the rear surface of the backrest 20 tilts naturally.

This axis of rotation 22/slot 21 connection makes it possible to combine a front/rear resistance over a certain portion of the slot, i.e. of this assembly that forms a slide, with an easy rotation beyond this that allows for an easy putting of the backrest 20 back into in its embedding, after the crash which indirectly caused these movements. A fusible element not shown in these figures consists, in this case, of a retaining towards the top, preventing, before activation, the upright 20 of the backrest to be translated. The solicitation upwards of the upright 20 of the backrest, along a globally vertical axis (axis Z) is rather weak in the usual tests and can be limited to about 30 kg (300 N). The fusible element that has to yield at about 300 N can be a simple rivet made of plastic or of metal while a fusible element yielding at 600 N·m about an axis of rotation would lead to a relatively heavy system.

In reference to FIGS. 5A and 5B, the lower end 30 of an upright of the seat is therefore embedded in a releasable manner in a fixed embedding 32 on the fixed structure of the seat. The theoretical rotation of the upright 20, i.e. of the lower end 30 of the upright 20 with respect to the embedding 32 is carried out thanks to a flexible strip 34 fixed onto an outer surface of the embedding 32. In the upper portion of the flexible strip 34 is fixed a slide-pinch 36 slidably surrounding the lower end 30 of the upright 20, as shown in FIG. 5B, after an impact on the rear face of the seat, i.e. on the upright 20, its lower end 30 is released from its embedded position in its embedding 32 via a translation upwards.

This elevation of the upright 20 and thereof of its lower end 30 is possible thanks to the fact that the slide-pinch 36 is not fixed to this lower end 30, but surrounds it in an adjusted manner.

Once the lower end 30 has exited from its embedding 32, the upright 20 pivots under the effect of the pressure of the impact of the head of the passenger located behind the seat thanks to the flexibility of the flexible strip 34 fixed to the embedding 32 and integral with the slide-pinch 36. After the exiting of the upright 20 with respect to the embedding 32 of the fixed frame of the seat, after a crash or an emergency landing, thanks to the slide-pinch 36 and to the flexible strip 34, each upright can be put back into its respective embedding 32.

In these FIGS. 5A and 5B, the mechanical fuse is not shown.

In reference to FIG. 6, a second considered embodiment of this operation of translation and of rotation can be carried out by means of a mechanical axis of rotation 40 fixed to the embedding 32 and to which is fixed the slide-pinch 36 slidingly surrounding the lower end 30 of the upright.

The slide-pinch 36 can be made from a plastic or metal material, with its main function being that of a guide, without taking up forces other than those of the mechanical axis of rotation 40.

The mechanical axis of rotation 40 is preferably metal, as it must not shift out of its axis during a crash and must make it possible to put the upright 20 back into its initial position after the test. The strip 34 can be metallic. It makes it possible to obtain, for one or a small number of tests, the rotation along an axis perpendicular to the main axis of the strip. The advantage of this embodiment is that the perpendicular imaginary axis can be slightly out-of-axis without causing any particular difficulties, during the putting back into position, after testing, of the upright in its embedding.

In addition, the position in the vertical direction (axis X) of the imaginary axis of rotation will not be fixed, thus minimising the forces.

In these two embodiments, the front/rear forces are transformed in rotation with the pivot connection and the top/bottom forces leading to a simple relative sliding of the uprights of the backrest with respect to their embedding.

In reference to FIG. 7, on a two-seater seat 51, three mechanisms are required since three uprights 50 are used therein. Their lower end 30 is therefore embedded in their embedding 32 in a releasable manner, as explained hereinabove. In this FIG. 7, the three slide-pinches 36 are also shown.

FIGS. 8A and 8B show this embodiment in more detail in the two positions before and after the crash, emergency landing or simple test. In FIG. 8A, each upright 50 is fixed by embedding by its lower end 30 in the fixed embedding 32 of the seat 51. The strip 34 is always fixed to the embedding 32.

In reference to FIG. 8B, after the impact caused on the rear face of the backrest of the seat, each upright 50 is released from its respective embedding 32 thanks to the sliding of the slide-pinch 36 fixed to the upper end of the flexible strip 34, itself fixed, by its lower end, to the embedding 32. The rotation of each upright 50 can therefore take place. It is understood that the flexible strip 34 makes it possible to put each upright 50 back into its respective embedding 32, after an impact, an accident, a crash, an emergency landing or a test.

The flexible strip 34 can be replaced with other flexible elements in general.

In reference to FIGS. 9A and 9B, the flexible element can also be formed from a spring blade 60 fixed, via a lower end 62 to the embedding 32 and via an upper end 64 to the end 30 of the upright. This spring blade 60 passes inside the loop that the slide-pinch 36 forms. Thus the upright 30 can slide.

In another embodiment, the flexible element is formed from two flexible rods 70A and 70B and mounted in a manner similar to the spring blade 60 of FIGS. 9A and 9B.

This flexible element can also be carried out in the form of a torsion spring formed of a flexible rod 80 of which the upper end 82 slidingly surrounds the lower end 30 of the upright. By a lower end 84, this rod 80 surrounds the embedding 32. The torsion effect takes place, in particular, on a bend 86 that connects the lower end 84 of the rod 80 to the latter. This solution of a torsion spring does not operate by a bending in the elastic zone, but via a spring effect, which allows the system to be able to be automatically placed in its position after a test or an accident.

This translation/pivot system does not have here for objective to allow for a new kinematics, but solely to decrease the effective stresses in torsion on the axis of rotation.

A translation/pivot connection makes it possible to combine a front/rear resistance over a certain portion of the sliding connection, and an easy rotation beyond, allowing for an easy putting back into place of the backrest after the crash. The fusible element consists in this case in a retaining upwards, preventing before the activation the pivot from being in a zone where the backrest can effectively rotate, with the solicitation according to the axis z being rather weak in the usual tests, and which can be limited to about 30 kg (300 N).

The invention claimed is:
1. A vehicle seat intended to be fixed to the floor of a cabin of a vehicle, comprising:

a fixed frame comprising feet and at least one seat base, and at least one backrest fixed to the fixed frame and comprising at least two uprights extending vertically with respect to the fixed frame, and a total number of the at least one backrest equals a total number of the at least one seat base, wherein the uprights are embedded by a lower end in the frame in a releasable manner with respect to the fixed frame in translation upwards in such a way as to be disembedded upwards under the effect of an impact on a rear face of the at least one backrest and are rotatably mounted around at least one fixed axis of the fixed frame in such a way as to be able to pivot forward after being disembedded.

2. The seat according to claim 1, further comprising at least one mechanical fuse between each upright and the fixed frame for blocking in translation the upright below a determined force.

3. The seat according to claim 2, wherein the pivoting of each upright is carried out with at least one flexible element fixed by a first lower end to the fixed frame, on an embedding, and, slidingly, by a second end to the upright, immediately above the lower end of the upright, making it possible to put back the upright embedded in the fixed frame after a pivoting with respect to the fixed frame.

4. The seat according to claim 3, wherein the second end of said at least one flexible element comprises a slide-pinch that surrounds the upright.

5. The seat according to claim 3, wherein the at least one flexible element is formed from a flexible strip.

6. The seat according to claim 3, wherein the at least one flexible element is formed from a spring blade.

7. The seat according to claim 3, wherein the at least one flexible element is formed of two flexible rods.

8. The seat according to claim 3, wherein the at least one flexible element is formed from a torsion spring which is formed from a rod, wherein the second end of the at least one flexible element surrounds the lower end of the upright, and wherein the first lower end of the at least one flexible element surrounds the embedding.

9. The seat according to claim 2, wherein the pivoting of each upright is carried out with at least one mechanical axis of rotation fixed to the fixed frame and a slot of the upright in a longitudinal direction of the upright and wherein the mechanical axis of rotation can slide.

10. The seat according to claim 2, wherein said at least one mechanical fuse is carried out with glue.

\* \* \* \* \*